United States Patent [19]
Hudson et al.

[11] Patent Number: 5,262,912
[45] Date of Patent: Nov. 16, 1993

[54] LIMIT STOP AND LIMIT STOP INCORPORATING A FLUX CONCENTRATOR LATCH FOR DISC DRIVES

[75] Inventors: Andrew J. Hudson; Clifford T. Jue, both of Santa Cruz, Calif.

[73] Assignee: Seagate Technology, Inc., Scotts Valley, Calif.

[21] Appl. No.: 894,417

[22] Filed: Jun. 5, 1992

[51] Int. Cl.$^5$ .............................................. G11B 5/54
[52] U.S. Cl. .................................................. 360/105
[58] Field of Search ........................................ 360/105

[56] References Cited

U.S. PATENT DOCUMENTS

| | | | |
|---|---|---|---|
| 4,947,274 | 8/1990 | Casey et al. | 360/105 |
| 5,034,837 | 7/1991 | Schmitz | 360/105 |
| 5,134,608 | 7/1992 | Strickler et al. | 360/105 X |
| 5,170,300 | 12/1992 | Stefansky | 360/105 |

Primary Examiner—Richard E. Gluck
Attorney, Agent, or Firm—Edward P. Heller, III

[57] ABSTRACT

A limit stop for defining the extremes of the range of motion of a disc drive actuator, and a magnetic latch which may be incorporated into the limit stop for holding the actuator at one of the extremes of its range of motion. Both the limit stop and limit stop with incorporated magnetic latch allow compliance to be determined based on material selection and dimensions. The magnetic latch includes a flux concentrator mounted on a limit stop and a magnetically permeable striker mounted on the moving portion of the actuator, and derives magnetic force for latching from the permanent magnet in the voice coil motor of the actuator.

7 Claims, 8 Drawing Sheets

LIMIT STOP AND LIMIT STOP INCORPORATING A FLUX CONCENTRATOR LATCH FOR DISC DRIVES

BACKGROUND OF THE INVENTION

1. Field of the Invention

This invention relates generally to the field of rigid disc drive data storage devices and more particularly to a limit stop for defining the range of motion of the disc drive actuator and into which can be incorporated a magnetic carriage latch in which the permanent magnet of the voice coil actuator motor is used to provide the latching force.

2. Brief Description of the Prior Art

Disc drive data storage devices have found widespread use as a cost effective and convenient mechanism for the storage of large computer programs and user generated data. Those types of disc drives known as "Winchester" disc drives incorporate rigid media, and the read/write heads "fly" above the disc surface on a thin layer of air dragged along by the spinning of the discs. An actuator mechanism is included to precisely move the read/write heads from one of a large number of circular, concentric tracks to another, in order to access any data recorded on the disc surface.

Market demands for increased storage capacity and decreased access time have lead to the almost exclusive use of voice coil motors (VCMs) to drive the actuator which positions the heads, while recent trends toward smaller and smaller form factors have lead to the preeminence of rotary VCM actuators. In a typical rotary VCM actuator, an array of permanent magnets with flux-concentrating pole pieces is fixedly mounted to a housing base or base plate, with a horizontal air gap provided which is the location of a high concentration of magnetic flux. A horizontal coil mounted to a pivot housing, which turns about a vertical axis, is suspended in the magnetic field, and an array of read/write heads is cantilevered from the side of the pivot housing opposite the coil and over the stack of discs. Controlled DC power is applied to the ends of the coil, and the polarity and magnitude of the DC voltage determines the direction and speed of the movement of the heads in accordance with the well-known Lorentz relationship.

Since VCM actuators have no inherent magnetic detent when power is removed from the disc drive, such disc drives must incorporate some sort of latching mechanism to hold the heads in a stationary relationship to the discs when power is removed, in order to prevent damaging relative movement between the heads and discs while the discs are not spinning. Similarly, some device must also be included to limit the range of motion of the actuator, should a "runaway" condition occur in the electronics controlling the coil power.

Historically, actuator latches—sometimes also referred to as carriage latches—have been of several different types, including solenoid-operated latches and magnetic latches. The main drawback of solenoid-operated latches is the power needed to operate them, and the physical size of the solenoids. Magnetic latches incorporating permanent magnets also take up significant space, and their operation can be severely influenced by the presence of the permanent magnet in the VCM of the actuator. Another common fault with magnetic latches is that they start to have an influence on the motion of the actuator even when the actuator is at a significant distance from its intended latch-up position, thus biasing the power required to move or hold the read/write heads within this "area of influence".

It is common practice to have the latch incorporate a limit stop to define one end of the range of motion of the actuator, while another mechanism is used to limit and define the other end of the range of motion.

Current industry trends toward the two-and-a-half inch and smaller form factors for disc drives have made it necessary to eliminate as many components as possible from the disc drive assembly, while minimizing the size of the remainder of components.

Clearly a need exists for a carriage latch which occupies a minimum of space within the disc drive structure, eliminates a large number of components when compared to prior art devices and yet provides adequate latching force to assure that the actuator remains latched under specified non-operating shock loads. Ideally, this latch should be integrated with the limit stops which define the range of motion of the actuator.

SUMMARY OF THE INVENTION

The present invention comprises a limit stop which can be used alone or be integrated with a magnetic actuator latch which utilizes the permanent magnet and associated magnetic field of the VCM to supply the magnetic latching force. The limit stop itself consists of an arm fixedly mounted to the base of the disc drive at one end and cantilevered from the fixed end in a direction lying in the plane of motion of the coil of the VCM. The free end of the limit stop forms a contact point that contacts the moving coil—or a contact feature attached thereto—to stop the motion of the actuator. The length, cross-sectional area and material of the limit stop determine the amount of "give" in the limit stop and thus the amount of shock transmitted to the head assemblies at contact. The magnetic latch of the present invention consists of a flux concentrator, which is mounted to the limit stop and lies within the magnetic field of the permanent magnet of the VCM, and a magnetically permeable striker element mounted on the coil of the VCM. When the actuator moves the striker element close enough to the flux concentrator, a secondary path for magnetic flux is formed which is used to hold the actuator in a fixed position until sufficient power is applied to the coil to overcome the holding force of the latch.

OBJECTS OF THE INVENTION

It is an object of the present invention to provide a limit stop for defining the range of motion of the VCM actuator of a disc drive data storage device.

It is another object of the present invention that limit stop of the invention be simple to manufacture and install in the disc drive.

It is another object of the present invention to incorporate a magnetic latch mechanism in the limit stop of the present invention without significantly increasing the size of the limit stop.

It is another object of the present invention to provide a magnetic latch mechanism which utilizes the permanent magnet in the voice coil motor of the actuator to generate the latching force.

It is an object of the present invention to provide both the striker and contact surface of the flux concentrator with cylindrical surfaces which interface at approximately right angles to provide a "point" contact for more reliably controlling the latching force of the mechanism.

These objects and various features of the present invention can best be understood by reference to the following detailed description of the invention when read in conjunction with the accompanying figures.

DETAILED DESCRIPTION OF THE INVENTION

Figure 1:
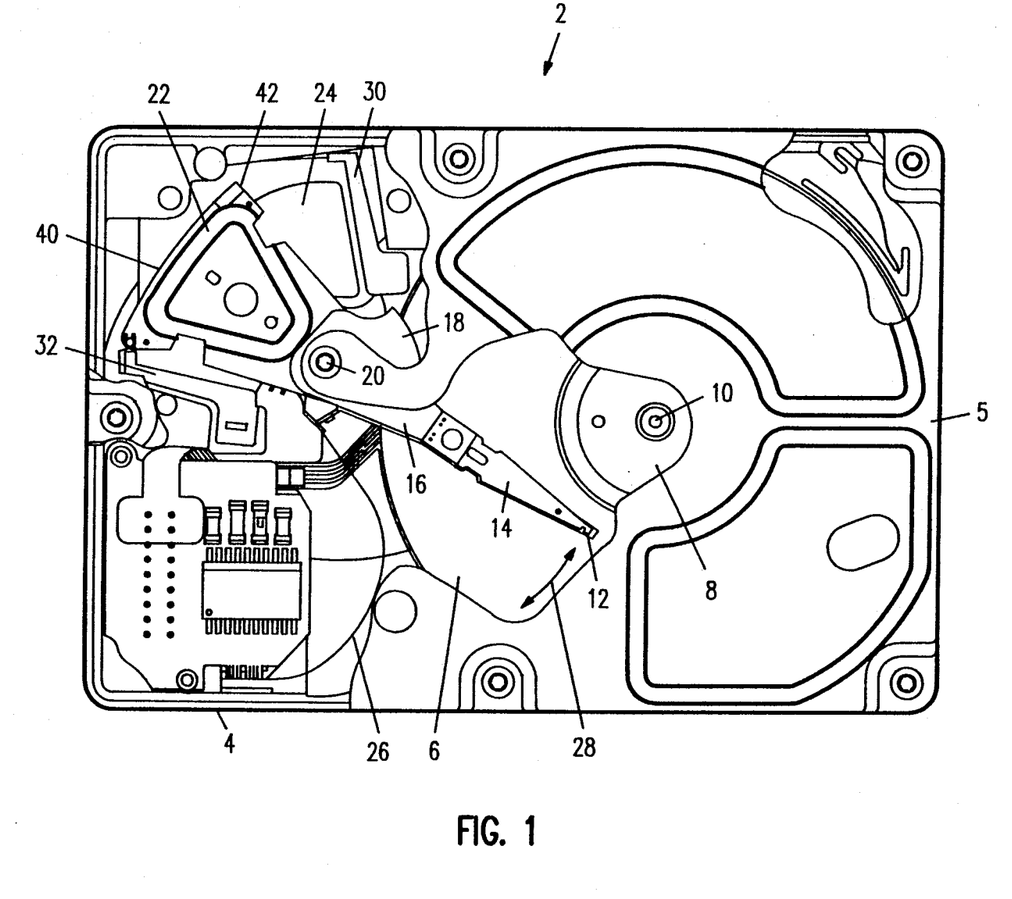
FIG. 1 is a top view of a disc drive data storage device which incorporates the present invention, with its top cover partially cut away.

Referring now to the drawings, and more specifically to FIG. 1, shown is a disc drive 2 of the type well known in the industry. The disc drive 2 includes a housing base 4 to which the majority of internal components are mounted, and a top cover 5 which is attached to the housing base 4 to form a sealed environment to protect the internal components from outside contamination. At least one disc 6 is mounted to a spindle motor (not shown) by means of a disc clamp 8 and disc clamp screw 10. While only one disc 6 is visible in this plan view, it is common practice to incorporate a stack of discs separated by disc spacers (not shown). FIG. 1 also shows a read/write head 12 mounted on a gimbal/load beam assembly 14, which in turn is mounted to a head arm 16. The head arm 16 is an integral part of an actuator body 18 which pivots about a pivot shaft shown generally at 20. Again, while only a single head 12 and gimbal/load beam assembly 14 are shown, it is common practice to include in the disc drive 2 a similar structure for each surface of each disc. On the opposite side of the actuator body 18 from the gimbal/load beam assemblies 14 is a coil 22 which forms a portion of the voice coil motor (VCM) which is used to move the heads 12 from track to track. A permanent magnet 24, fixedly mounted to the housing base 4, provides a flux field within which the coil 22 is suspended. When controlled DC voltages are applied to the coil 22 via a printed circuit cable (pcc) 26, the coil is controllably moved in relationship to the permanent magnet 24, thus moving the heads 12 along an arcuate path 28 across the data tracks (not shown). Signals to and from the read/write heads 12 are also carried on the pcc 26.

FIG. 1 also shows a non-latching limit stop 30 and a latching limit stop 32 with the incorporated magnetic latch of the present invention as they are located within the disc drive 2, which will be discussed in detail below.

Figure 2A:
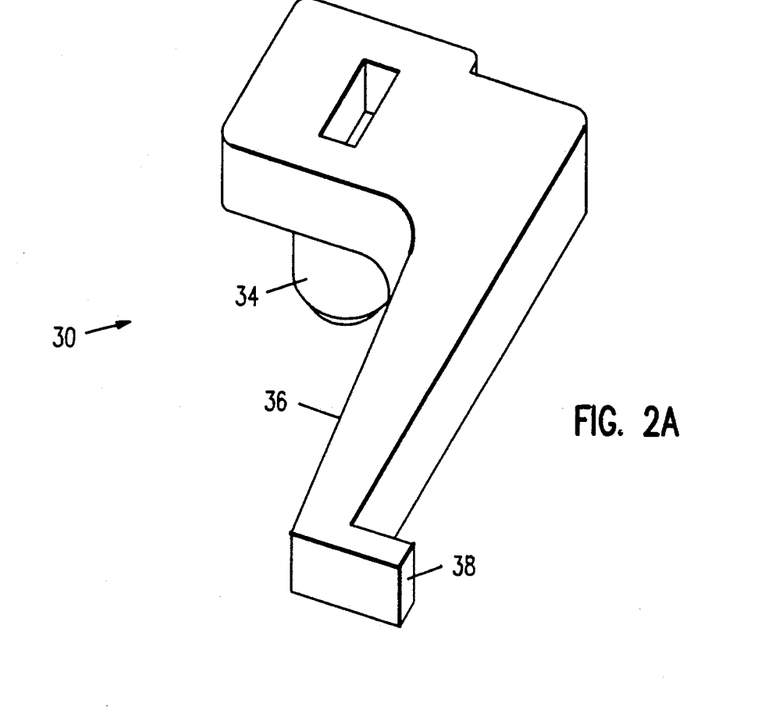
FIGS. 2A and 2B are top and bottom perspective views, respectively, of the limit stop of the present invention without the latching mechanism included.
Figure 2B:
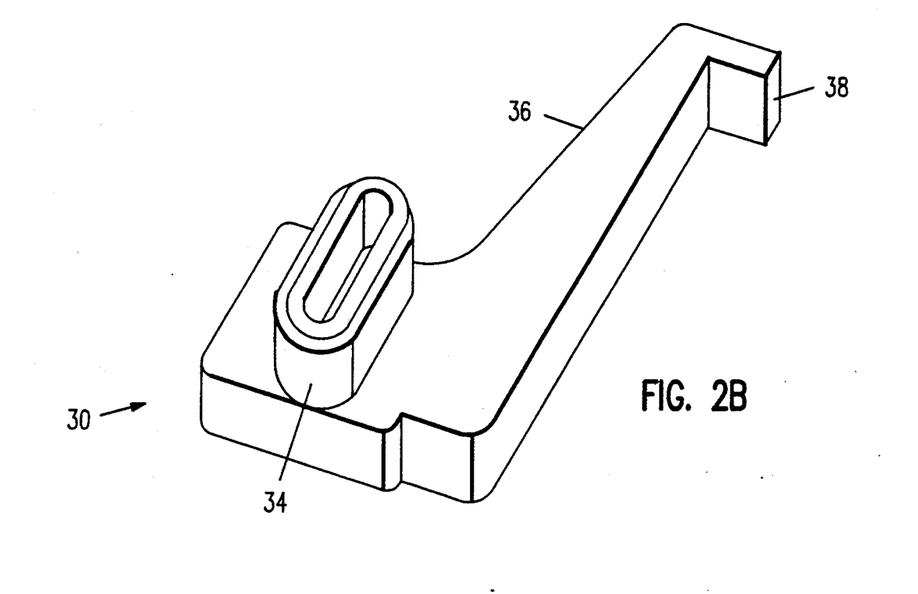

Turning now to FIGS. 2A and 2B, shown is the non-latching limit stop 30 of the present invention. As can be seen, the non-latching limit stop 30 is basically an L-shaped component which includes a mounting tab 34 used to anchor the non-latching limit stop 30 to the housing base (4 in FIG. 1). The remainder of the non-latching limit stop 30 is made up primarily of an elongated arm 36 which is cantilevered from the mounting tab 34 in a plane substantially parallel to the plane of the housing base 4. The elongated arm 36 terminates in a contact surface 38, which will contact a specially adapted stop surface on the moving coil, as will be discussed below. The non-latching limit stop 30 is preferably made of a non-conducting, non-magnetically permeable material.

Referring now to both FIGS. 1 and 2, it can be seen that a striker and stop assembly 40 is attached to the end of the coil 22 most distant from the pivot shaft 20. This striker and stop assembly 40 is also made of plastic or other similar non-conducting, non-magnetically permeable material and has a stop surface 42 at the end closest to the non-latching limit stop 30. When the actuator body 18 is rotated in the clockwise direction to the extreme end of its intended range of motion, the stop surface 42 of the stop and striker assembly 40 contacts the contact surface 38 of the non-latching limit stop 30, thus limiting motion of the actuator in the clockwise direction. It is desirable, because of the speeds attained by the actuator and the fragility of the head/gimbal/load beam assembly 12,14, that this type of contact not be of a rigid, non-yielding nature. This desirable compliance is an inherent feature of the non-latching limit stop 30 because of the nature of cantilevered arms. Since contact is being made on the non-latching limit stop 30 at a point most distant from the fixed mounting point, the cantilevered arm 36 "gives" when it comes into contact with the stop surface 42 on the stop and striker assembly 40. The amount of compliance in this system is dependent on the materials used and the dimensions of the components, and is easily selectable based on these parameters. Experimentation has shown that Victrex 450G, a patented polyetheretherketone (PEEK) product of ICI Advanced Materials of Exton, Pa., is a suitable material, not only for its relative strength, but also because of other considerations, such as wear resistance, low flammability, stability over temperature variations and ease of processing.

Figure 3A:
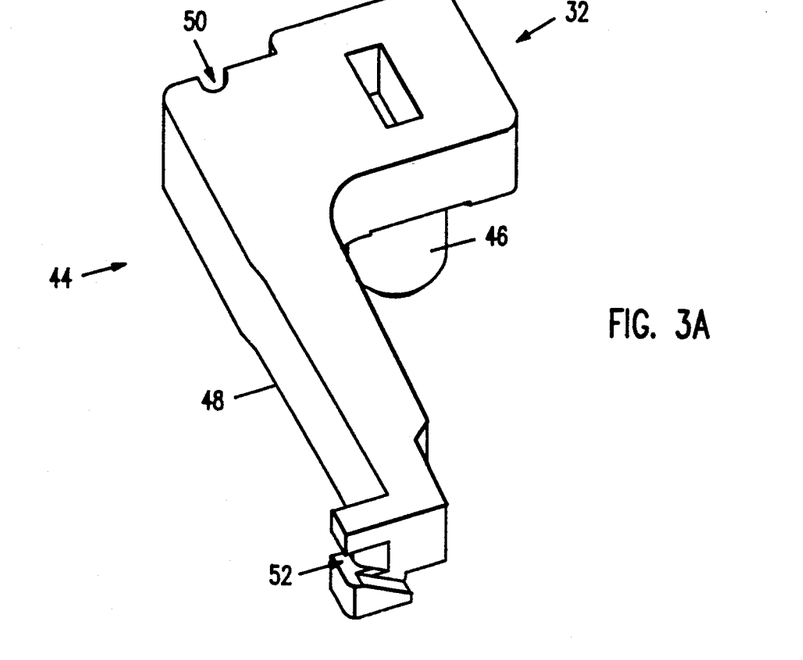
FIGS. 3A and 3B are top and bottom perspective views, respectively, of the limit stop of the present invention showing modifications to accommodate the latching mechanism.
Figure 3B:
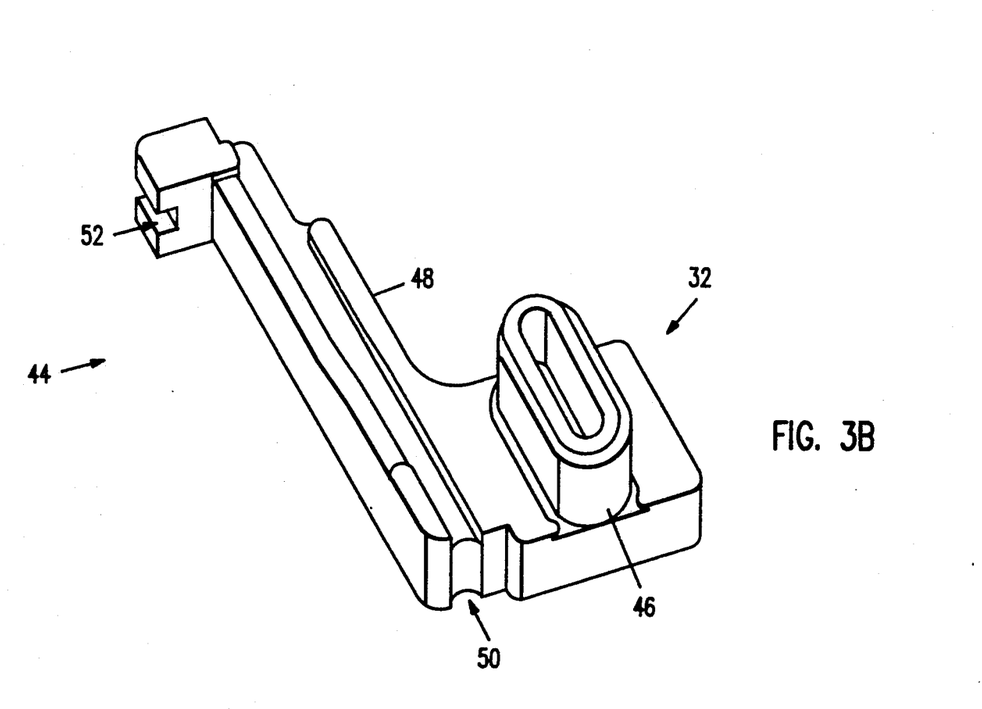

FIGS. 3A and 3B are perspective views of the limit stop and latch housing 44, which makes up a portion of the latching limit stop 32, and shows modifications made to accommodate the magnetic latch of the present invention. FIG. 3 is fundamentally a mirror image of FIG. 2, indicating that the latching limit stop 32 would normally be found on the opposite side of the coil 22 from the non-latching limit stop 30, as was seen in FIG. 1. The choice of whether to "park" the heads at the inner or outer radius of the disc 6 is a design decision. Usually, if the heads are intended to come to rest on the disc surfaces when power is removed, the heads are parked at the inner radius to minimize the starting torque requirement on the spindle motor. In some applications, however, the heads are intended to be parked on ramp structures which must, of necessity, be located closely adjacent the outer radius of the discs. The limit stop and magnetic latch of the present invention is well suited for either situation.

As can be seen in FIG. 3, the limit stop and latch housing 44 is similar in construction to the non-latching limit stop 30 of FIGS. 2A and 2B. That is, the limit stop and latch housing 44 is basically an L-shaped component, made from a non-conducting, non-magnetically permeable material and includes a mounting tab 46 for attaching the part to a complementarily shaped opening in the housing base (4 in FIG. 1), and an elongated arm 48 which, when the part is mounted to the housing base 4, extends in a plane substantially parallel to the housing base 4, but with the underside sloping slightly upward from the base of the mounting tab 46. The primary difference between the limit stop and latch housing 44 and the non-latching limit stop 30 of FIGS. 2A and 2B is a channel 50 included in the limit stop and latch housing 44 for the accommodation of a flux concentrator (not shown), which will be described below. This channel 50 begins near the mounting tab 46, extends along the underside of the length of the elongated arm 48 and wraps around the distal end of the elongated arm 48 and terminates in a notch 52 in that portion of the part that compares to the contact surface 38 of the non-latching limit stop 30.

Figure 4:
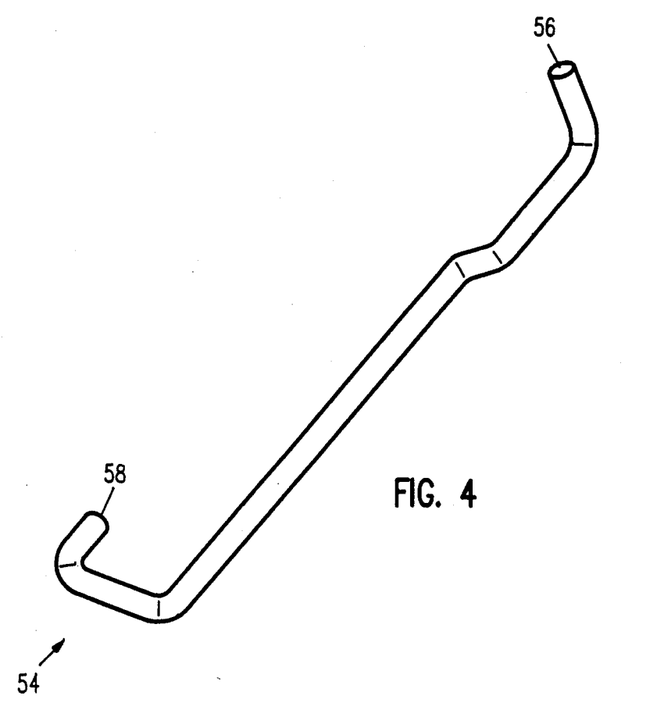
FIG. 4 is a perspective view of the flux concentrator of the latching mechanism of the present invention.

The flux concentrator 54 of the present invention is shown in FIG. 4, and, as can be seen, consists of a formed piece of wire. Tests have shown that wire made from stainless steel AISI 430 is a particularly suitable material for production of the flux concentrator 54, although other materials can be envisioned which would work well in similar applications. The flux concentrator 54 is shaped at the first end 56 to fit into the end of the channel 50 (FIGS. 3A and 3B) in the limit stop and latch housing (44 in FIGS. 3A and 3B) closest to the mounting tab (46 in FIGS. 3A and 3B), and then extend along the underside of the length of the channel 50 in the elongated arm (48 in FIGS. 3A and 3B). The second end 58 of the flux concentrator 54 is shaped to wrap around the distal end of the limit stop and latch housing 44 and terminate in the notch 52 in the distal end of the limit stop and latch housing 44. The specific angles at which the flux concentrator 54 is bent are selected to allow the flux concentrator 54 and the limit stop and latch housing 44 to be assembled together without adhesives or other attachment means. This prevents concerns about out-gassing or migration of adhesives within the sealed environment of the disc drive.

Figure 5:
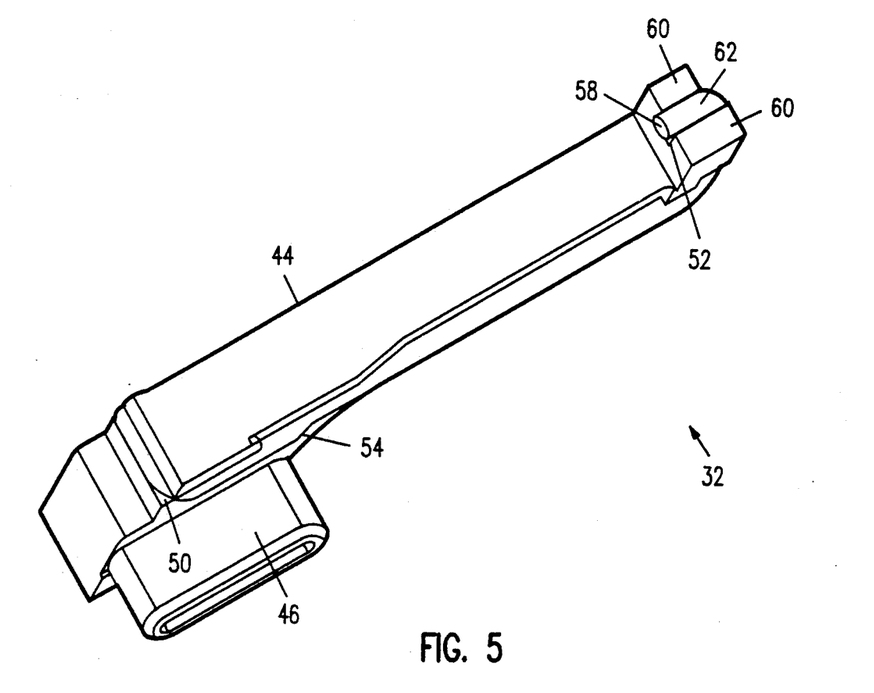
FIG. 5 is a perspective view of the limit stop of FIGS. 3A and 3B as assembled with the flux concentrator of FIG. 4.

The exact relationship between the limit stop and latch housing 44 and the flux concentrator 54 can perhaps be best seen by referring to FIG. 5 which is a perspective view of the two components as assembled together as the latching limit stop 32, and viewed from the under side of the assembly. In FIG. 5, the flux concentrator 54 is shown lying in the channel 50 of the limit stop and latch housing 44. The second end 58 of the flux concentrator 54 is shown resting in the notch 52 in the end of the limit stop and latch housing 44. Indeed, the notch 52 and the flux concentrator 54 are so dimensioned that the outer surface of the flux concentrator 54 is raised above the surfaces numbered 60 on either side of the notch 52 and thus forms the latch contact surface 62.

As can also be seen in FIG. 5, the flux concentrator 54 projects below the base of the mounting tab 46 in the area near the mounting tab 46 and rises away from the base of the mounting tab 46 as it extends toward the distal end of the limit stop and latch housing 44. The reason for this feature will be discussed below.

Figure 6:
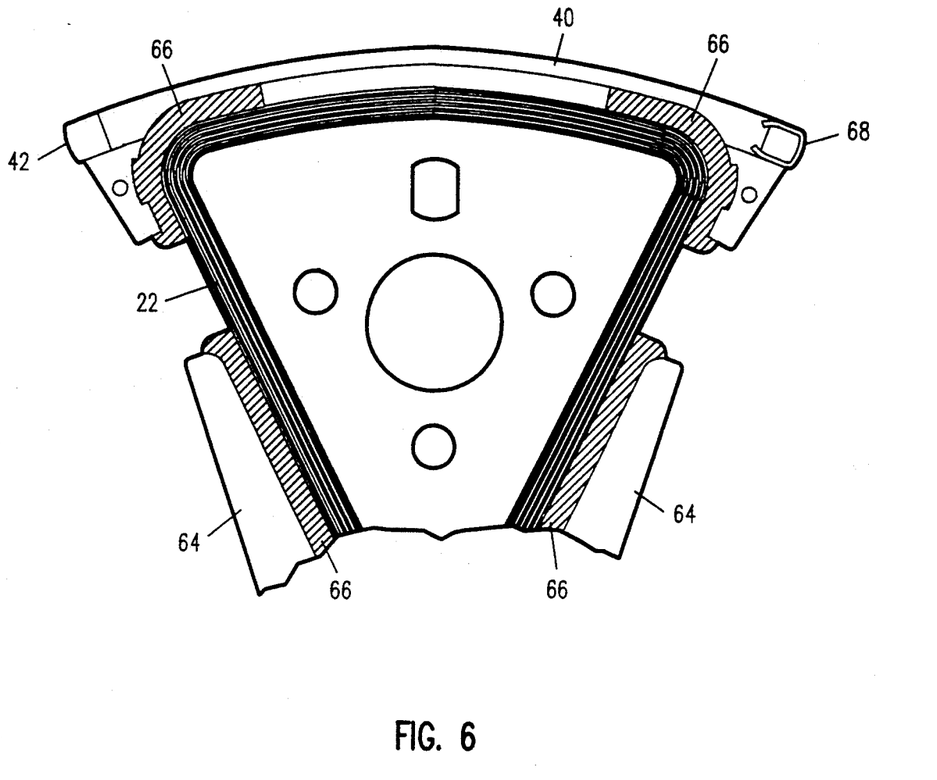
FIG. 6 is a detailed bottom plan view of the stop and striker assembly of the latch of the present invention.

FIG. 6 is a detailed bottom plan view of the stop and striker assembly 40 of the present invention and shows the relationship between this part and the coil 22 of the VCM. As FIG. 6 shows, the coil 22 is mounted to a pair of actuator arms 64 which are an integral part of the actuator body (18 in FIG. 1) by an adhesive 66, such as Loctite 352 and the stop and striker assembly 40 is also mounted to the distal end of the coil 22 by the same adhesive 66. The stop and striker assembly 40 is manufactured of a non-conducting, non-magnetically permeable material such as AMODEL AF-1115 VO, a product of Amoco Performance Products, Inc., Atlanta, Ga., or equivalent with the exception of the magnetic striker 68 which is molded into the stop and striker assembly 40. The magnetic striker 68 itself is in the form of an open cylinder having a C-shaped cross-section and is fabricated from stainless steel AISI 430 or similar material.

Figure 7:
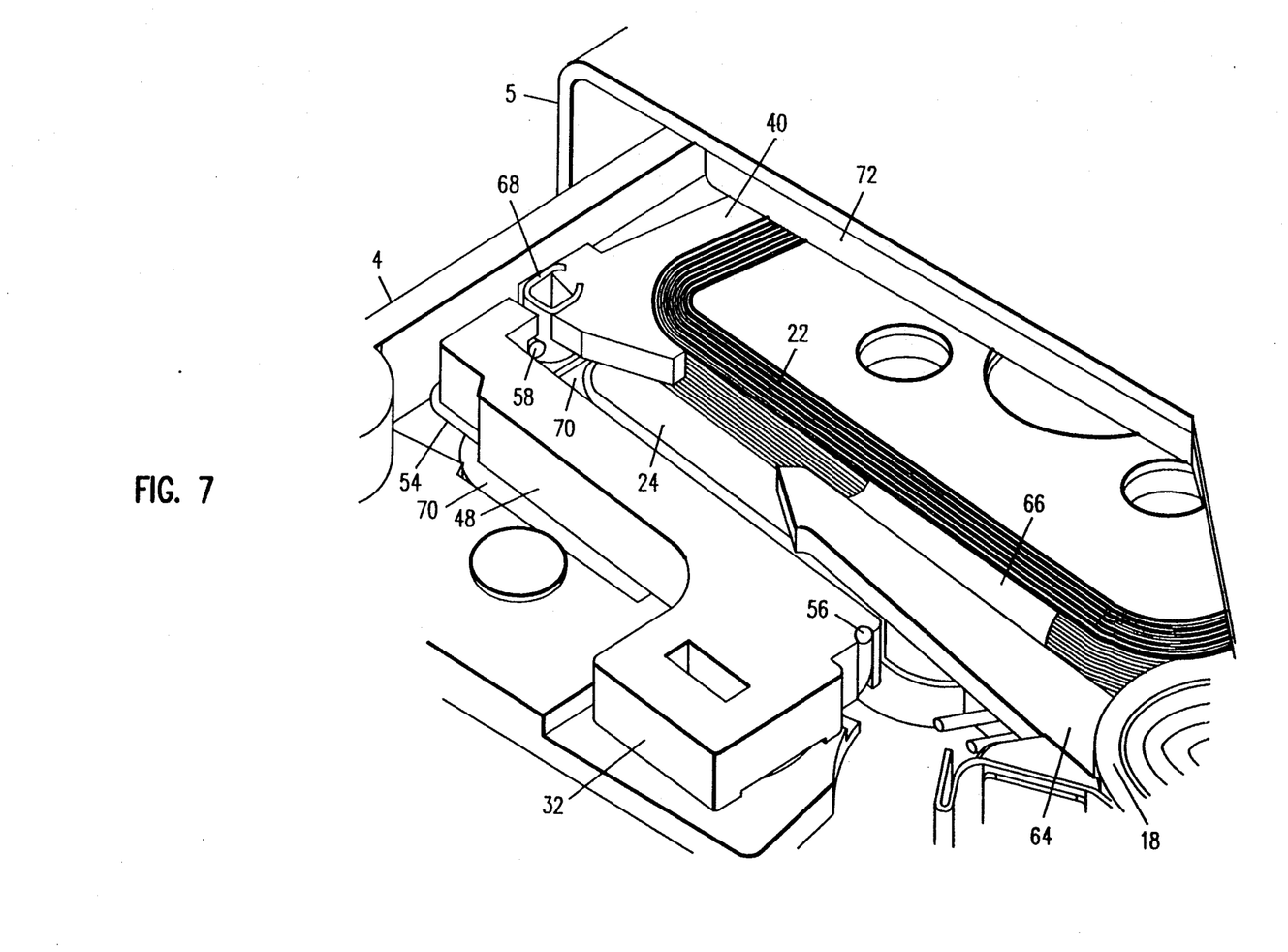
FIG. 7 is a partial perspective cutaway view of the voice coil motor and latching limit stop of the present invention.

The actual relationship between the components can perhaps best be seen by referring to FIG. 7, which is a partially cutaway perspective view of the actuator VCM and the latching limit stop 32 of the present invention. In FIG. 7, the coil 22 is shown mounted by adhesive 66 to one of the arms 64 which are an integral part of the actuator body (shown partially at 18). Also shown is the stop and striker assembly 40 which is mounted on the end of the coil 22 opposite the actuator body 18. Molded into the stop and striker assembly 40 is the magnetic striker 68. The coil 22 is suspended by the actuator body 18 above the permanent magnet 24 of the VCM, which is mounted on a lower pole piece of magnetically permeable material, shown partially at 70, which is, in turn, fixedly attached to the housing base 4. The lower pole piece 70 extends beyond the extent of the permanent magnet 24 and under the elongated arm 48 of the latching limit stop 32. The top cover 5 is shown in cutaway, and serves to support an upper pole piece 72 also formed of a magnetically permeable material.

The flux concentrator 54 can be seen in three locations in the view of FIG. 7. The first end 56 is shown near the mounting portion of the latch, bending under the elongated arm 48 of the latching limit stop 32. The flux concentrator 54 reappears as it nears the distal end of the elongated arm 48 and bends around the end of the arm, and the second end 58 of the flux concentrator 54 can be seen resting in, and protruding slightly beyond, the notch 52 in the end face of the elongated arm 48. From this view, it is apparent that the only contact between the coil/stop and striker assembly 22/40 and the latching limit stop 32 is made between the magnetic striker 68 and the second end 58 of the flux concentrator 54.

With this type of arrangement, it can be seen that contact between the flux concentrator 54 and the magnetic striker 68 is made only at the single point where the two cylindrical surfaces meet. Such an arrangement is highly desirable in a volume manufacturing environment, since it is very forgiving of variations in the vertical position of the flux concentrator contact surface 62 and in the vertical position of the magnetic striker 68. This is, since the two orthogonally arranged cylindrical surfaces meet in a single point, the location of the point of contact on the surface of either or both cylinders can vary without causing a significant change in the amount of latching force.

Figure 8:
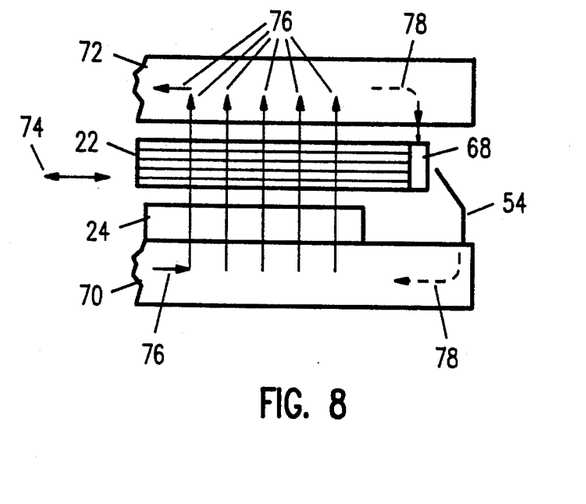
FIG. 8 is a diagrammatic sectional view showing the flux paths in the VCM and in the latch mechanism of the present invention.

The magnetic flux pattern which exists within the VCM and the magnetic latch of the present invention is shown in FIG. 8, which is a simplified diagrammatic sectional view of the VCM and magnetic latch components. In FIG. 8, the lower pole piece 70 of the VCM is shown with the permanent magnet 24 mounted on top of the lower pole piece 70. The upper pole piece 72 is supported in parallel with the lower pole piece 70 and permanent magnet 24 by the top cover 5 (not shown). Between the upper pole piece 72 and the permanent magnet 24, the coil 22 is supported for movement in the directions shown by an arrow 74, and the magnetic striker 68 is shown as being attached to the coil at the closest point to the flux concentrator 54. The primary flux path is shown by the solid arrows 76 to run from the lower pole piece 70 upward through the permanent magnet 24 and the coil 22 to the upper pole piece 72. The opposite end (not shown) of the permanent magnet 24 is polarized in the opposite direction, so that the primary magnetic flux will flow in a counterclockwise direction in this view. The magnetic latch of the present invention takes advantage of a secondary flux path shown by dashed arrows 78. This diagram clearly shows that the flux concentrator 54 is positioned in a location between the lower and upper pole pieces 70, 72. The flux concentrator 54 is held in this position by the limit stop and latch housing 44 (not shown for clarity) and is close to, or in contact with, the lower pole piece 70, while being spaced away from the upper pole piece 72. When the coil 22 is moved into proximity with the flux concentrator 54, a secondary flux path is formed from the upper pole piece 72 through the magnetic striker 68 to the flux concentrator 54 and thence to the lower pole piece 70. The magnetic latch of the present invention thus uses the magnetism inherent in the permanent magnet 24 of the VCM to provide latching power for the actuator, without the introduction of an additional permanent magnet into the design.

Several factors have to be considered in determining the final design of a latch made in accordance with the present invention. Once a desired latching force has been determined based on the mass and balance of the moving portion of the actuator, the magnetic power of the permanent magnet(s) in the VCM and the shock specification for the product, factors such as the diameter of the wire used to form the flux concentrator, the height of contact surface of the flux concentrator above the lower pole piece, and the distance of the magnetic striker from the upper pole piece can all be varied to obtain the desired latching force.

Figure 9:
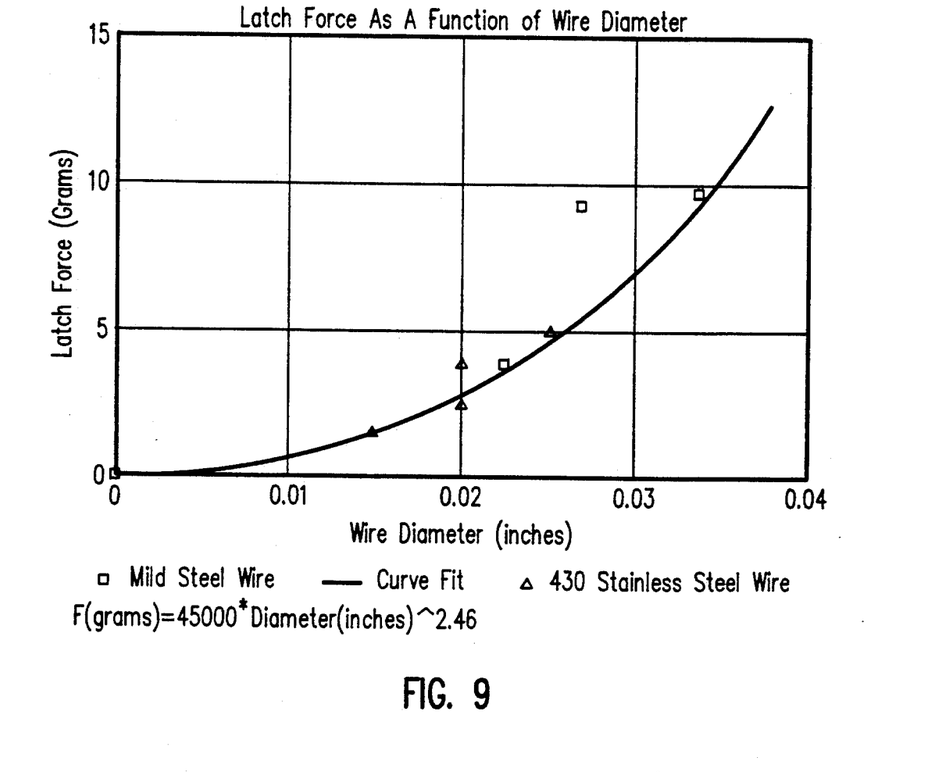
FIG. 9 is a chart which shows the variation in latching force versus wire diameter of the wire used to form the flux concentrator.

For instance, FIG. 9 shows the variation in latching force dependent on the diameter of the wire used to form the flux concentrator. The vertical scale shows latching force in grams, while the horizontal scale shows increasing wire diameters from left to right. In the graph shown, two different materials were also tested: a "mild" steel, noted by the square marks, and 430 stainless steel, as noted by the triangular marks. In all cases, other factors noted above were held constant. As can be seen, in general increasing the wire diameter increases available latching force. A mathematically fitted curve defines this relationship as $$F = 45,000 * D^{2.46}$$

where

F is the latching force in grams, and;
D is the wire diameter in inches.

It should be noted that two samples were include with a diameter of 0.020". One of these was hand-formed, while the other was a tooled part with a better finish at the contact point. The hand formed part produced a latching force of 2.5 grams, while the tooled part produced a latching force of 3.5 grams, indicating that surface finish at the contact point is also a factor influencing latching force, with a smoother finish providing increased latching force.

Figure 10:
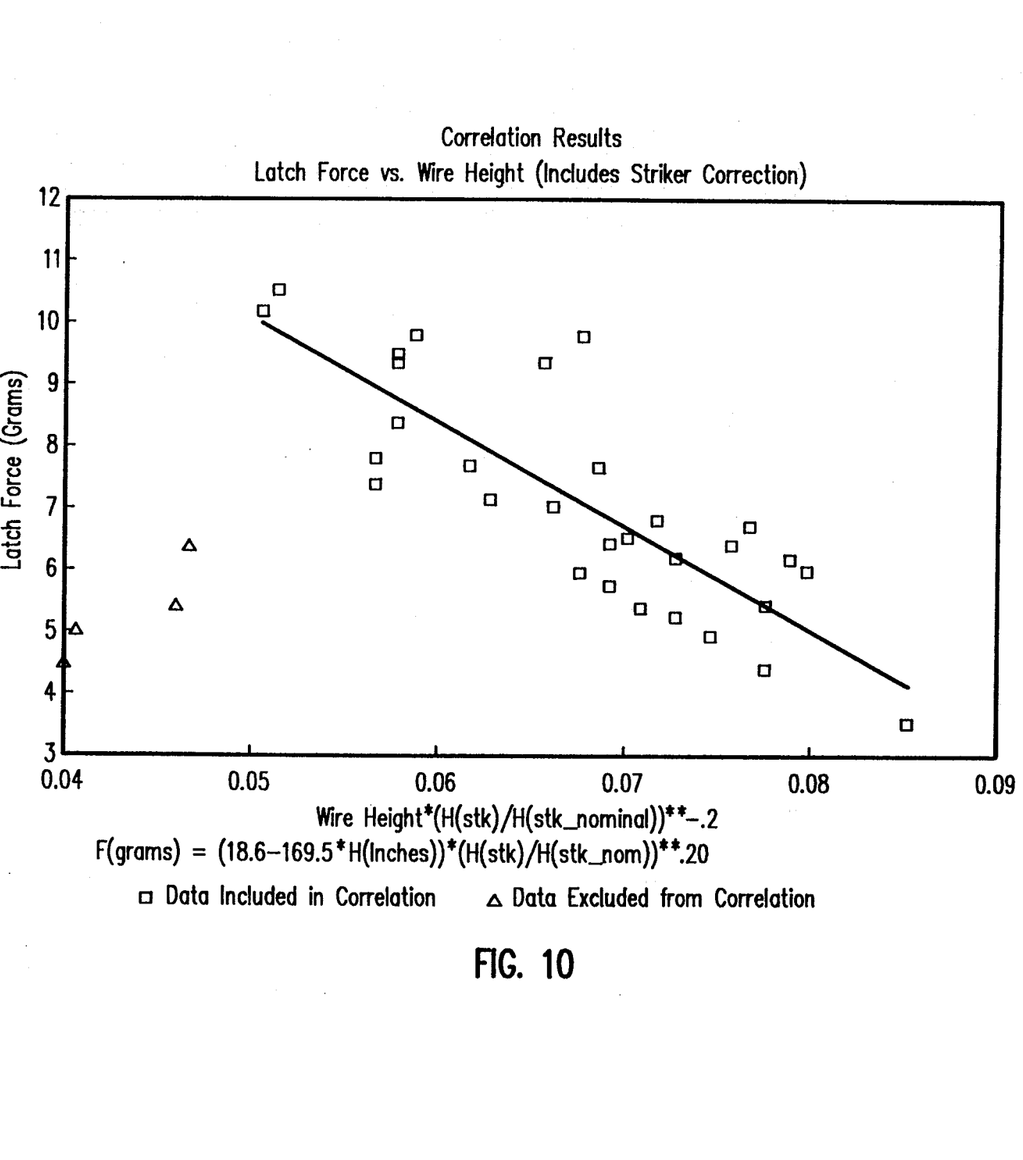
FIG. 10 is a chart showing the effect on latching force of the height of the contact surface of the flux concentrator above the lower pole piece.

FIG. 10 is a graph showing the effect of the height of the contact surface of the flux concentrator above the lower pole piece. The plot includes a correction to compensate for striker height variation. In all examples plotted in FIG. 10, a flux concentrator having a diameter of 0.025" was used. The vertical scale is again latching force in grams, while the horizontal scale shows variations in the height of the contact surface of the flux concentrator above the lower pole piece.

From the distribution of the resulting plots, it can be concluded that decreasing the spacing between the lower pole piece and the flux concentrator contact surface increases the latching force until a point after which a dramatic "fall-off" in latching force is evident. The "fall off" occurs when the contact surface of the flux concentrator (center line of the wire) falls below the bottom of the striker, which is nominally 0.045 inches above the lower pole piece. With the contact surface of the flux concentrator at or below this height, the flux concentrator starts to "miss" the bottom of the striker, thus diminishing the latching force.

Proper contact is made only when the striker and contact surface meet at the single point where the two cylindrical surfaces meet at a right angle.

While the data for FIG. 10 was collected to study allowable variances in the location of key components, the data are illustrative of the effects of these variations on the performance of the latch of the present invention.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A limit stop and magnetic latch for defining an extreme of a range of motion for a moving portion of a voice-coil-motor-driven disc drive actuator and magnetically latching the moving portion of the actuator at the extreme comprising:

a latch housing, formed of a non-conducting, non-magnetically permeable material, including
mounting means for fixedly attaching the limit stop and magnetic latch to a housing base,
an elongated arm member extending from the mounting means in a plane substantially parallel to the housing base to a distal end lying in the path of motion of the moving portion of the actuator,
a flux concentrator, formed of a magnetically permeable material, mounted on the latch housing, extending along the length of the elongated arm and forming, at the distal end of the elongated arm, a contact surface, and a striker, formed of a magnetically permeable material, mounted on the moving portion of the actuator and adapted to contact the contact surface of the flux concentrator, whereby, when the moving portion of the actuator brings the striker into proximity with the contact surface of the flux concentrator, a secondary flux path is formed in the voice coil motor to magnetically latch the moving portion of the actuator.

2. A limit stop and magnetic latch as claimed in claim 1 wherein the limit stop and magnetic latch is compliant in the direction of motion of the moving portion of the actuator, and this compliance is controlled by selection of the material of the latch housing and cross-sectional and longitudinal dimensions of the elongated arm.

3. A limit stop and magnetic latch as claimed in claim 1 wherein the material of the latch housing is a plastic.

4. A limit stop and magnetic latch as claimed in claim 1 wherein the material of the flux concentrator is stainless steel.

5. A limit stop and magnetic latch as claimed in claim 1 wherein the material of the striker is stainless steel.

6. A limit stop and magnetic latch as claimed in claim 1 wherein the contact surface of the flux concentrator and the striker are cylindrical in shape and orthogonally arranged relative to each other to provide a single point of contact for the application of latching force.

7. A disc drive magnetic latch for a disc drive actuator having a pair of opposed magnetically permeable flux paths means; at least one permanent magnet mounted on one of said flux path means in the space between them, a rotatable arm having coil means mounted on one end thereof in a manner that the coil means passes between the flux path means during operation; the latch comprising:

a magnetically permeable contact mounted on said coil means;

a magnetically permeable member mounted in close proximity to one of said flux path means so as to define a low reluctance path between the member and said one flux path means; the member extending to a height such that said contact and said member are in physical contact when said actuator is in a latching position;

the combination of said contact and said magnetically permeable member providing a low reluctance path between the respective flux return path means when they are in contact so as to provide a magnetic latch in said latching position; and wherein said contact has a cylindrical surface aligned in a first direction and said magnetically permeable member has a cylindrical surface aligned in a second direction substantially perpendicular to the first such that when the two are in physical contact, the two cylindrical surfaces are in contact to thereby provide a more reliable single point contact to more reliably control the amount of latching force.

* * * * *